United States Patent
Spangler

(10) Patent No.: US 7,430,717 B1
(45) Date of Patent: Sep. 30, 2008

(54) METHOD FOR ADAPTING A K-MEANS TEXT CLUSTERING TO EMERGING DATA

(75) Inventor: William Scott Spangler, San Martin, CA (US)

(73) Assignee: International Business Machines Corporation, Armonk, NY (US)

(*) Notice: Subject to any disclaimer, the term of this patent is extended or adjusted under 35 U.S.C. 154(b) by 391 days.

(21) Appl. No.: 09/669,680

(22) Filed: Sep. 26, 2000

(51) Int. Cl.
 *G06N 3/00* (2006.01)
(52) U.S. Cl. .................................... 715/500
(58) Field of Classification Search ................ 715/532, 715/513, 517, 523, 530, 500; 382/305; 358/403; 707/1, 5, 6, 10; 704/10
 See application file for complete search history.

(56) References Cited

U.S. PATENT DOCUMENTS

| | | | | |
|---|---|---|---|---|
| 5,317,507 | A | * | 5/1994 | Gallant ....................... 715/532 |
| 5,675,819 | A | * | 10/1997 | Schuetze ...................... 704/10 |
| 5,832,182 | A | | 11/1998 | Zhang et al. |
| 5,857,179 | A | | 1/1999 | Vaithyanathan et al. |
| 5,864,855 | A | * | 1/1999 | Ruocco et al. ................. 707/10 |
| 5,999,927 | A | * | 12/1999 | Tukey et al. .................... 707/5 |
| 6,012,058 | A | | 1/2000 | Fayyad et al. |
| 6,298,174 | B1 | * | 10/2001 | Lantrip et al. ............... 382/305 |

OTHER PUBLICATIONS

"Computer Oriented Approaches To Pattern Recognition," by William S. Meisel, Academic Press (1972), pp. 144-146.

Cutting et al., "Scatter/Gather: A Cluster-Based Approach to Browsing Large Document Collections", Proc. Of the Annual International ACM SIGIR Conference, vol. 15, No. 21, 1992, pp. 318-329.

Al-Daoud et al., "New Methods for the Initialisation of Clusters", Pattern Recognition Letters Elservier Netherlands, vol. 17, No. 5. 1996, pp. 451-454.

Steinbach et al., "A Comparison of Document Clustering Techniques", Technical Report, 2000, pp. 1-20.

Pena et al., "An Empirical Comparison of four initialization methods for the K-Means Algorithm", Pattern Recognition Letters, vol. 20, No. 10, 1999, pp. 1027-1040.

(Continued)

*Primary Examiner*—Stephen Hong
*Assistant Examiner*—Kyle R Stork
(74) *Attorney, Agent, or Firm*—Gibb & Rahman, LLC

(57) ABSTRACT

A method and structure for clustering documents in datasets which include clustering first documents and a first dataset to produce first document classes, creating centroid seeds based on the first document classes, and clustering second documents in a second dataset using the centroid seeds, wherein the first dataset and the second dataset are related. The clustering of the first documents in the first dataset forms a first dictionary of most common words in the first dataset and generates a first vector space model by counting, for each word in the first dictionary, a number of the first documents in which the word occurs, and clusters the first documents in the first dataset based on the first vector space model, and further generates a second vector space model by counting, for each word in the first dictionary, a number of the second documents in which the word occurs. Creation of the centroid seeds includes classifying second vector space model using the first document classes to produce a classified second vector space model and determining a mean of vectors in each class in the classified second vector space model, the mean includes the centroid seeds.

12 Claims, 3 Drawing Sheets

OTHER PUBLICATIONS

Jain et al., "Data Clustering: A Review", ACM Computing Surveys, vol. 31, No. 3, September, pp. 264-323, 1999.

Marina Meila, "An Experimental Comparison of Several Clustering and Initialization Methods", Technical Report, 1998, pp. 1-22.

Bollacker et al., "A Scalable Method for Classifier Knowledge Reuse", International Conference of Houston, TX, vol. 3, 1997, pp. 1474-1478.

Bradely et al., "Refining Initial Points for K-Means Clustering" International Conference, 1998, pp. 91-99.

* cited by examiner

METHOD FOR ADAPTING A K-MEANS TEXT CLUSTERING TO EMERGING DATA

BACKGROUND OF THE INVENTION

1. Field of the Invention

The present invention generally relates to computerized datasets and more particularly to a method and system for automatically categorizing, indexing, and classifying items within such datasets.

2. Description of the Related Art

K-means is a well known algorithm for clustering (i.e. partitioning) a dataset of numeric vectors, where each numeric vector has dimensionality M and there are N such vectors. The value, K, refers to an input parameter of the algorithm that determines the number of such clusters (i.e. partitions) that the algorithm will produce at completion. In general, K-means, from a given starting point, finds a locally optimum way to cluster the dataset into K partitions so as to minimize the average difference between the mean of each cluster (cluster centroid) and every member of that cluster. This difference is measured by some distance metric, such as Euclidean distance.

In the case of text datasets, the N vectors represent text documents and dimensionality M refers to the occurrence of certain keywords or phrases in the text documents. The dictionary of keywords or phrases may be derived by counting the occurrence of all words and/or phrases in the text corpus and selecting those words and phrases that occur most often.

PROBLEMS TO BE SOLVED BY THE INVENTION

The major drawback of conventional techniques is that they cannot take an existing K-means classification (as represented by the K centroids) and adapt it to a new, but related, dataset (e.g. one taken from the same domain at a later time).

A typical instance of this problem arises with helpdesk problem tickets. Support for consumer and commercial products is often provided telephonically. In such situations, an operator (often referred to as a "helpdesk" operator) receives a telephone call with a problem. The telephone operator assigns each problem a specific identification code and records the user's problem (and the help advice provided) in a computerized file. In such a system, if the user calls back, other help desk operators can retrieve the computerized file using the specific identification code. This prevents the user from having to wait to speak with a specific help desk operator. Additionally, this system provides a helpdesk dataset of problems and solutions which other help desk operators can access when offering potential solutions to users.

Free form computer helpdesk datasets consist primarily of short text descriptions, composed by the helpdesk operator for the purpose of summarizing what problem a user had and what was done by the helpdesk operator to solve that problem. A typical text document (known as a problem ticket) from this data consists of a series of exchanges between an end user and an expert helpdesk advisor.

For example, one problem ticket may read as follows: "1836853 User calling in with WORD BASIC error when opening files in word. Had user delete NORMAL.DOT and had the user reenter Word. The user was fine at that point. 00:04:17 ducar May 2:07:05:656 P". This problem ticket begins with the unique identification number, which is followed by a brief identification of the user's problem, the solution offered, the help desk operators name or identification symbol, and a date and time stamp.

Problem tickets may include only of a single symptom and resolution pair, as in the above example, or the problem tickets may span multiple questions, symptoms, answers, attempted fixes, and resolutions, all pertaining to the same basic issue. Problem tickets are opened when the user makes the first call to the helpdesk and are closed when all user problems documented in the first call are finally resolved in some way. Helpdesk operators enter problem tickets directly into the database. Spelling, grammar and punctuation are inconsistent. The style is terse and the vocabulary very specialized. Therefore, the contents of the help desk dataset are not very useful for answering future problems because the data is not easily searched, categorized, or indexed.

In co-pending U.S. patent application Ser. No. 09/542,859, incorporated herein by reference, one solution to the foregoing problem involves mining helpdesk datasets for "problem resolution nuggets". In other words, this solution finds those problem tickets that describe both the symptoms of a problem and how the helpdesk operator solved that problem. Such problem resolution nuggets can then be utilized to create solution documents to put on a web site, or to create automated knowledge bases that can diagnose the user's problem automatically and suggest a corrective action.

With such a system, helpdesk problem tickets may be classified using a K-means algorithm for the month of January. Subsequently, there may be a need to reuse this-classification in the month of February. It is assumed that the underlying classes in the dataset have not changed drastically between January and February, but certain small changes could have taken place. For example, new kinds of problems may have been introduced that necessitate new classes being created to represent them.

However, conventional solutions merely run the K-means again from scratch on the new February data. Unfortunately, due to the fact that the resulting K-means clusters are highly dependent on the initial starting point (seeds), a strong possibility exists that the new February clustering will not have a very close relationship to the original K-clusters. In other words, for any given cluster in the original K-means clustering (January), there will not necessarily be a similar cluster of dataset points in the subsequent K-means clustering (February). This lack of continuity is a drawback when one is interested in tracking changes in the data (trends) over time.

To solve this problem, the invention identifies new emerging concepts in the succeeding dataset while retaining those concepts that carry over from the previous dataset.

SUMMARY OF THE INVENTION

It is, therefore, an object of the present invention to provide a structure and method of clustering documents in datasets which include clustering first documents and a first dataset to produce first document classes, creating centroid seeds based on the first document classes, and clustering second documents in a second dataset using the centroid seeds, wherein the first dataset and the second dataset are related.

The clustering of the first documents in the first dataset forms a first dictionary of most common words in the first dataset and generates a first vector space model by counting, for each word in the first dictionary, a number of the first documents in which the word occurs, and clusters the first documents in the first dataset based on the first vector space model, and further generates a second vector space model by counting, for each word in the first dictionary, a number of the second documents in which the word occurs.

Creation of the centroid seeds includes classifying second vector space model using the first document classes to produce a classified second vector space model and determining a mean of vectors in each class in the classified second vector space model, the mean includes the centroid seeds.

The invention also includes a method of clustering documents in datasets which form a second dictionary of most common words in the second dataset, generating a third vector space model by counting, for each word in the second dictionary, a number of the second documents in which the word occurs, and clustering the documents in the second dataset based on the second vector space model to produce a second dataset cluster, wherein the clustering of the second documents in the second dataset using the centroid seeds produces an adapted dataset cluster and, the method further including comparing classes in the adapted dataset cluster to classes in the second dataset cluster, and adding classes to the adapted dataset cluster based on the comparing.

The invention can also include a system for clustering documents in datasets including a storage having a first dataset and a second dataset, a cluster generator operative to cluster first documents in the first dataset and produce first document classes, and a centroid seed generator operative to generate centroid seeds based on the first document classes, wherein the cluster generator clusters second documents in the second dataset using the centroid seeds.

ADVANTAGES OF THE INVENTION

One advantage of the invention lies in the ability to identify new emerging concepts in a succeeding dataset while retaining those concepts that carry over from a previous dataset.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

In the following description it is assumed that an initial text dataset, T1 (e.g., January helpdesk data), is classified first, followed by a new, but related text dataset, T2 (e.g., February helpdesk data) which should be classified similarly, but should also be indexed to highlight emerging trends.

Figure 1:
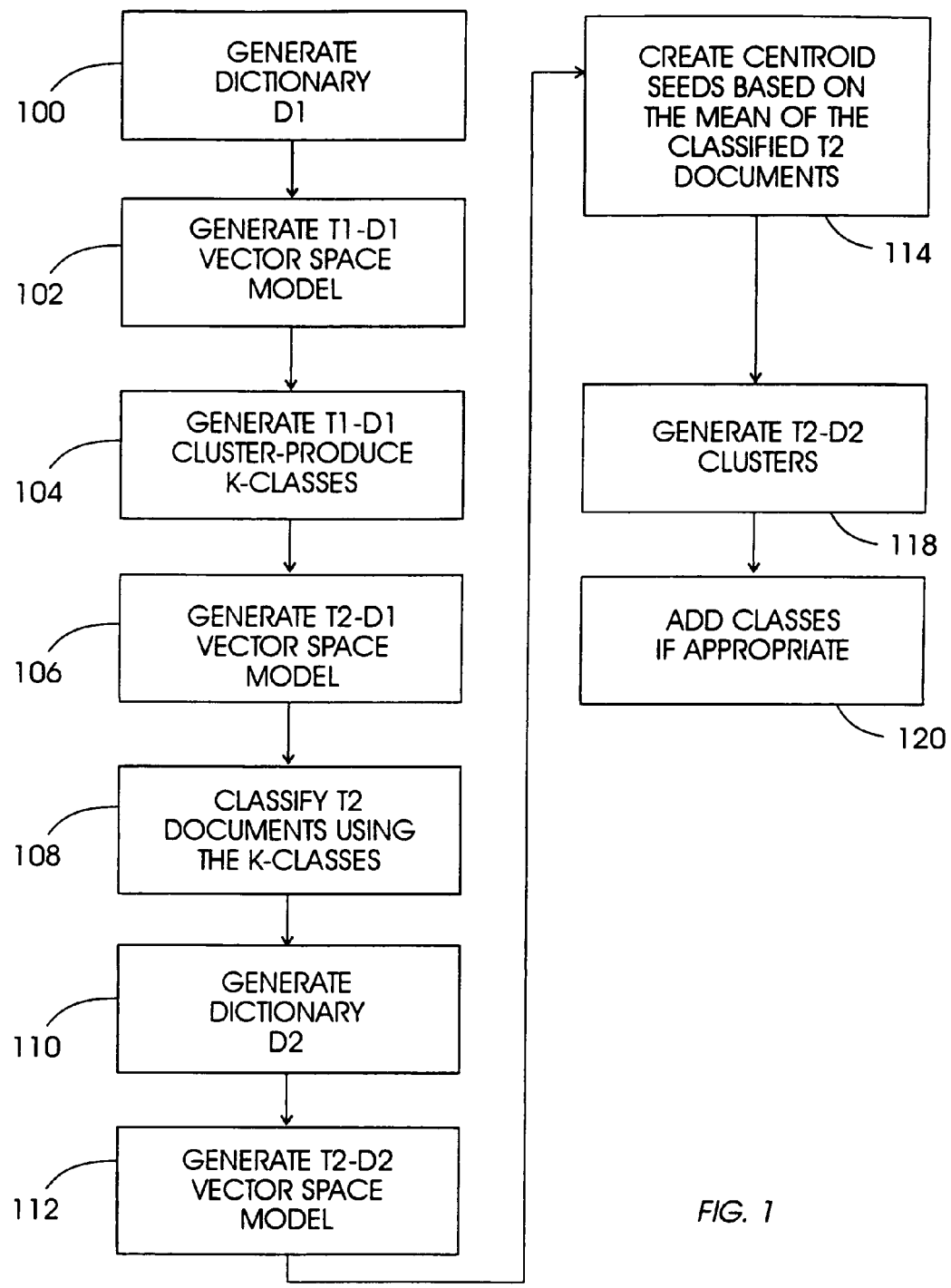
FIG. 1 is a flowchart illustrating one embodiment of the invention.
Figure 2:
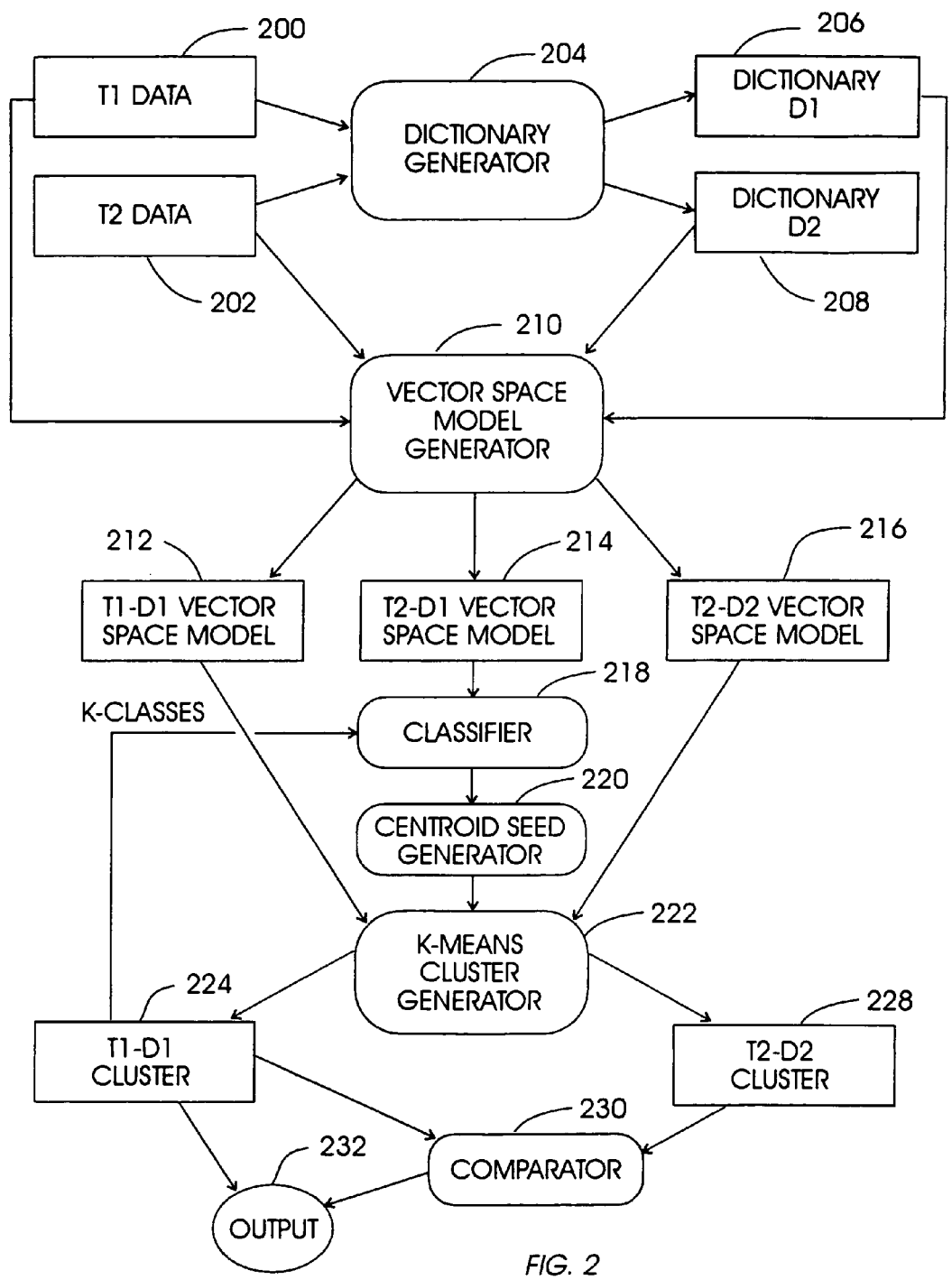
FIG. 2 is a schematic architectural diagram of one embodiment of the invention.

Referring now to the drawings, FIG. 1 is a flowchart illustrating a first aspect of the invention and FIG. 2 is a schematic diagram of the functioning elements of this embodiment of the invention. In item 100, the invention begins by generating a first dictionary 206, D1, of frequently used words from dataset T1 200 using a dictionary generator 204. The most frequently occurring words in the corpus make up the dictionary. This reduced set of words will be used to compose a simple description of each document in the corpus. The number of words to be included in the dictionary is a user specified parameter.

Then, the vector space model generator 210 counts, for each word in the first dictionary D1 206, the number of documents in which the word in question appears, to produce a T1-D1 vector space model 202. In item 102, by counting the occurrences of dictionary words in documents of dataset T1, the invention generates a matrix of non-negative integers where each column corresponds to a word in the dictionary and each row corresponds to an example in the text corpus. The values in the matrix represent the number of times each dictionary word occurs in each example. Since most of these values will, under normal circumstances, be zero, this matrix is described as "sparse". This property of sparseness is used to greatly decrease the amount of storage required to hold the matrix in memory, while incurring only a small cost in retrieval speed.

In item 104, a K-means cluster generator 222 clusters (i.e. partitions) the documents in the first dataset T1 based on the T1-D1 vector space model. The clustering algorithm "K-means" is one of the most popular procedures for automatic classification of data when no classification is known (Duda, R. O. and Hart, P. E. (1973). *Pattern Classification and Scene Analysis*. Wiley.).

The inventive K-means algorithm utilizes the cosine distance metric to determine the distance (d) between a centroid (X) and an example vector (Y):

$$d(X, Y) = -\frac{X \bullet Y}{\|X\| \cdot \|Y\|}$$

The implementation also requires a user supplied input for K, the number of clusters to produce. For example, a text clustering could be made with K=3.

Next, in item 106, for the second text dataset T2 202, the vector space model generator 210 generates a T2-D1 vector space model 214, by counting, for each word, the number of documents in the second dataset T2 202 in which the word in the D1 dictionary 206 appears. Following that, in item 108, the classifier 218 classifies the documents in the T2-D1 vector space model 214 by finding for each document in T2 202, the nearest centroid (based on the K-classes of the T1-D1 cluster 224) to that document using the distance metric (e.g., Cosine) from item 104. In other words, the invention classifies the documents within the T2 data 202, using the classes produced during the generation of the T1-D1 cluster 224 to make the clustering of the T2 data 202 similar to the clustering on the T1 data 200, as explained in greater detail below.

A second dictionary D2 208 is generated by the dictionary generator 204 in item 110 based on the most frequently occurring terms in dataset T2. Since the most frequently occurring terms may differ between the first dataset 200 and the second dataset 202, it is important to recompute the dictionary for dataset T2.

The vector space model generator 210 then, in item 112, creates a T2-D2 vector space model 216 based on, for each word in the D2 dictionary 208, the number of documents in T2 202 in which the words in the D2 dictionary 208 appear.

A centroid seed generator 220 then creates centroid seeds based on the mean of each of the classes from the T2-D1 vector space model 214 as classified by the classifier 218 (based on the K-classes from the T1-D1 cluster) and inputs the centroid seeds to the K-means cluster generator 222, as shown in item 114. The initial centroid (seed) for each class is found by summing up the columns of all examples in the class and dividing these values by the number of elements in the class. Centroid seeds are used to generate the initial clustering which is then optimized using the K-means approach.

More specifically, given a set of K centroids the invention finds, for each example point, the centroid to which it is closest. Each example point is now said to "belong to the class" of its nearest centroid. Then, the invention calculates the mean of each class. Each mean now becomes the new centroid, and there are again K centroids. The invention repeat the foregoing until no change results in class membership as the result of finding new centroids.

Obviously the starting place of this process will, to some extent, determine the final resulting classes. The starting points (seeds, or initial centroids) are conventionally selected in some random fashion to prevent undo biasing of the algorithm. To the contrary, the invention intentionally biases the algorithm towards the previous classification centroids. Thus, the invention directs the K-means solution towards the original classification (January) without preventing it from adjusting that classification in February as the data determines.

As mentioned above, in item 108, the documents in T2 are classified using the classifier 218. In item 114, the mean of these classified T2 documents in document space D2 is used to create seeds in the D2 space using the centroid seed generator 220. New clusters are then generated in item 118 by the K-means cluster generator 222 to generate T2-D2 clusters 228.

Item 120 is an optional process used to add additional J clusters to the set of K seeds, depending on whether the user suspects additional concepts have been introduced in the new dataset T2, as determined by the comparator 230 (which compares the T1-D1 cluster and the T2-D2 cluster). If the new concepts found in item 120 are not useful (e.g. represent uninteresting subconcepts of the original K classes) then the result may be discarded or the additional new J-classes may be output 232.

At the users discretion, the additional J clusters may be added to capture any new, emerging concepts that may be contained in dataset T2. New J-class seeds may be chosen in any number of ways, including by random selection of data points from T2. In general, carefully choosing the new seeds to reflect areas of the data that are not well represented by the centroids generated in item 17 will produce the best results. The number of J additional clusters is a user determined parameter ((just as K is a user determined parameter). The user determines the correct value through a process of trial and error. For example, if the user choose a value J=5 and saw a result where two of the additional cluster were spurious (i.e. a cluster is spurious if it contains no new concepts or too few examples to be meaningful) then the correct value of J would be 3. If all 5 new clusters contained valuable concepts then the user might next try J=10, and so on until J was set large enough to create some spurious clusters.

The invention can be implemented, for example, as a computer program, written in the Java programming language and running on top of the Java virtual machine. An implementation which uses random sampling to throw away the poorest seeds is described below.

```
package com.ibm.cv.text;
import java.Io.*;
import java.util.*;
import java.awt.*;
import com.ibm.cv.*;
public class AddClusters {
    public int numToAdd = 0;
    public int originalSize = 0;
    public KMeans k;
    public static int numAdditional = 1 0;
//Given a KMeans clustering this method will add the given
//number of clusters to it.
public AddClusters(KMeans x, int added) {
    numToAdd = added;
```

-continued

```
    k = x;
    originalSize = k.nclusters;
    int numseeds = k.nclusters + numToAdd;
    k.nclusters = humseeds;
    seeds = new float[numseeds] [ ];
    for (int i=0; i<originalSize; i++) // add the original centroids to
        the new centroid list seeds[i] = k.centroids[i];
    for (int i=0; i<(numToAdd+numAdditional); i++) {//create a set
        of potential centroids int e = (int)(k.ndata*Math.random( ));
        float pseed[ ] =k.getData(e);
        potentialSeeds.addElement(pseed);
    }
    getGoodSeeds( ); // eliminate bad centroids and iteratively and
                    // put the remainder in the seeds array
k.centroids = seeds; // reset the centroids of the KMeans object
k.run( ); // run KMeans
}
public void getGoodSeeds( ) {
    //iteratively remove the worst candidate seed until only the
        best candidates remain.
    for (int i=0; i<numAdditional; i++)
      replace WorstSeed( );
    for (int i=originalSize; i<k.nclusters; i++)
      seeds[i] = (float[ ])potentialSeeds.elementAt(i-originalSize);
} public void replaceWorstSeed( ) {
       int pos = findWorstSeed( );
       potentialSeeds.removeElementAt(pos);
    } public int findWorstSeed( ) {
       // returns the seed with the lowest data membership count.
       int counts[ ] = new int[potentialSeeds.size( )];
       for (int i=0; i<k.ndata; i++) {//count the number of data
          elements going to each seed
       int s = findNearestSeed(i)-originalSize;
       if (s>=0) counts[s]++; //ignore data elements that go to the original
          centroids
       }
       int result = Util.min(counts);
       return(Util.findPosition(result, counts));
    }
    public int findNearestSeed(int d) {
       int best = -1;
       float bestval = 1.0F;
       // first check the new candidate centroids
       for (int i=0; i<potentialSeeds.size0; i++) {
          float pseed[ ] = (float[ ])potentialSeeds.elementAt(i);// pseed =
             PotentialCentroid
          float val = k.getDistance(d,pseed); // calculate distance between
             point d and pseed
          if (val<bestval) {
             best = i+originalSize;
             bestval = val;
          }
       }
       // then check the old centroids
       for (int i=0; i<originalSize; i++) {
          float val = k.getDistance(d,k.centroids[i]);//calculate distance
between d and original centroid
          if (val<bestval) {
             best = i;
             bestval = val;
          }
       }
       // return the best centroid.
       return(best);
}
```

Figure 3:
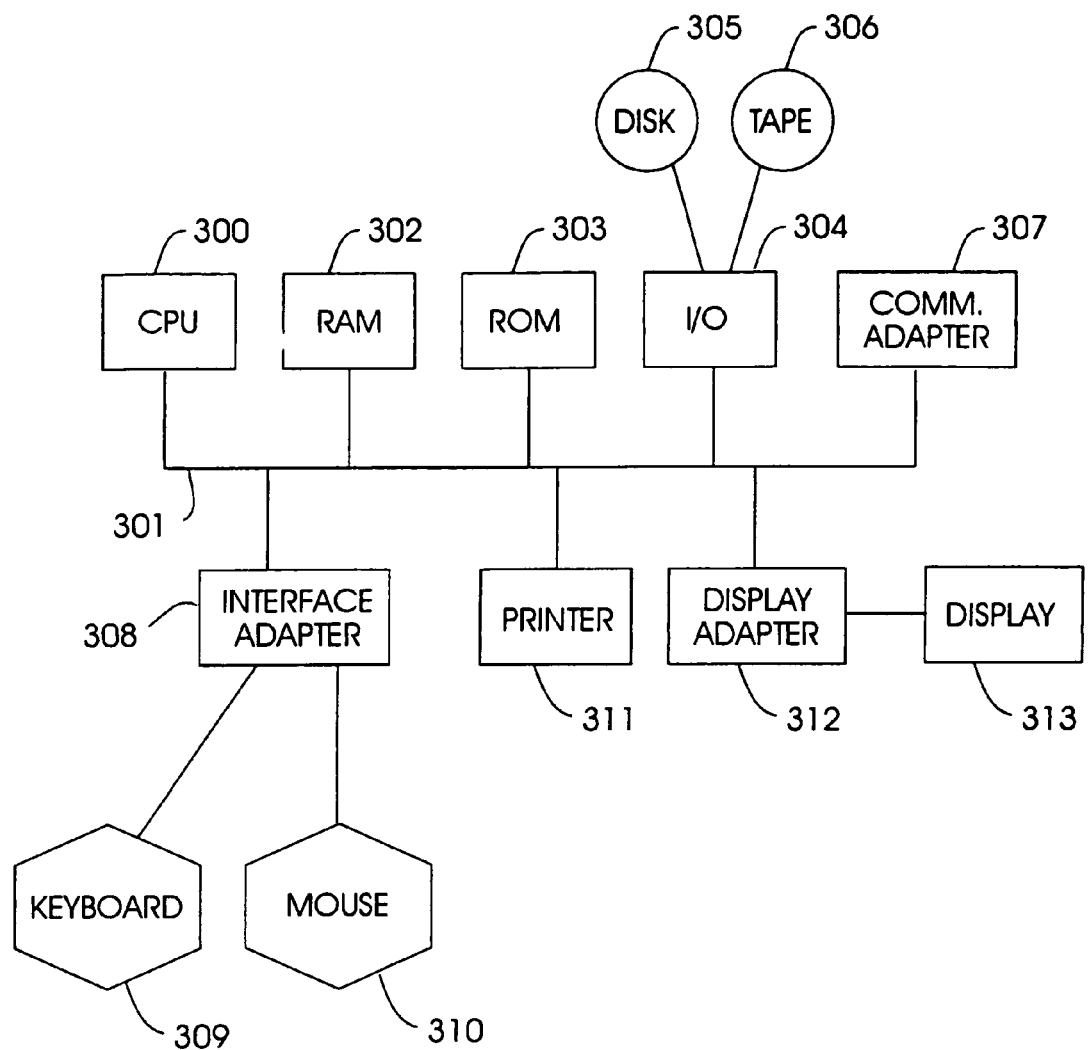
FIG. 3 is a hardware embodiment for implementing the invention.

While the overall methodology of the invention is described above, the invention can be embodied in any number of different types of systems and executed in any number of different ways, as would be known by one ordinarily skilled in the art. For example, as illustrated in FIG. 3, a typical hardware configuration of an information handling/computer system in accordance with the invention preferably has at least one processor or central processing unit (CPU) 300. For example, the central processing unit 300 could include various image/texture processing units, mapping units, weighting units, classification units, clustering units, filters, adders, subtractors, comparators, etc. Alternatively, as would be known by one ordinarily skilled in the art given this disclosure, multiple specialized CPU's (or other similar individual functional units) could perform the same processing, mapping, weighting, classifying, clustering, filtering, adding, subtracting, comparing, etc.

The CPU 300 is interconnected via a system bus 301 to a random access memory (RAM) 302, read-only memory (ROM) 303, input/output (I/O) adapter 304 (for connecting peripheral devices such as disk units 305 and tape drives 306 to the bus 301), communication adapter 307 (for connecting an information handling system to a data processing network) user interface adapter 308 (for connecting peripherals 309-310 such as a keyboard, mouse, imager, microphone, speaker and/or other interface device to the bus 301), a printer 311, and display adapter 312 (for connecting the bus 301 to a display device 313). The invention could be implemented using the structure shown in FIG. 3 by including the inventive method, described above, within a computer program stored on the storage device 305. Such a computer program would act on an image supplied through the interface units 309-310 or through the network connection 307. The system would then automatically segment the textures and output the same on the display 313, through the printer 311 or back to the network 307.

Therefore, the invention provides an automated way to cluster a dataset that relates to a previously clustered dataset, while still maintaining some correspondence between the first and second clustering results. Thus, with the invention, the result of the second clustering will be aligned with the first clustering. Indeed, in most instances, the classes defined by the first clustering will remain as the major classes in the second clustering process. However, the second clustering produces an enhanced set of classifications that include further sub-classifications (or new classes). The invention can perform such actions because the invention performs such clustering from seeds that are based upon the classifications set up in the first clustering process of the first dataset (e.g., January help desk datasets).

While the invention has been described in terms of preferred embodiments, those skilled in the art will recognize that the invention can be practiced with modification within the spirit and scope of the appended claims.

What is claimed is:

1. A method for clustering documents in datasets comprising:
    a storage having a first dataset and a second dataset;
    a cluster generator operative to cluster first documents in said first dataset and produce first document classes;
    a centroid seed generator operative to generate centroid seeds based on said first document classes;
    a dictionary generator adapted to generate a first dictionary of most common words in said first dataset; and
    a vector space model generator adapted to generate a first vector space model by counting, for each word in said first dictionary, a number of said first documents in which said word occurs,
    wherein said cluster generator clusters said documents in said first dataset based on said first vector space model,
    wherein said cluster generator clusters second documents in said second dataset using said centroid seeds, such that said second dataset has a similar based on said centroid seeds, clustering to that of said first dataset, and
    wherein said second dataset comprises a new, but related, based on said centroid seeds, dataset different than said first dataset.

2. The method in claim 1, all the limitations of which are incorporated herein by reference, wherein said vector space model generator generates a second vector space model by counting, for each word in said first dictionary, a number of said second documents in which said word occurs.

3. The method in claim 2, all the limitations of which are incorporated herein by reference, further comprising:
    forming a second dictionary of most common words in said second dataset;
    generating a third vector space model by counting, for each word in said second dictionary, a number of said second documents in which said word occurs; and
    clustering said documents in said second dataset based on said third vector space model to produce a second dataset cluster.

4. The method in claim 3, all the limitations of which are incorporated herein by reference, wherein said clustering of said second documents in said second dataset using said centroid seeds produces an adapted dataset cluster and said method further comprises:
    comparing classes in said adapted dataset cluster to classes in said second dataset cluster; and
    adding classes to said adapted dataset cluster based on said comparing.

5. A method of clustering documents in related datasets comprising:
    forming a first dictionary of most common words in a first dataset;
    generating a first vector space model by counting, for each word in said first dictionary, a number of said first documents in which said word occurs;
    clustering said first documents in said first dataset based on said first vector space model to produce first document classes;
    generating a second vector space model by counting, for each word in said first dictionary, a number of said second documents in which said word occurs;
    classifying said second documents in said second vector space model using said first document classes to produce a classified second vector space model;
    determining a mean of vectors in each class in said classified second vector space model to produce centroid seeds; and
    clustering second documents in a second dataset using said centroid seeds, such that said second dataset has a similar, based on said centroid seeds, clustering to that of said first dataset,
    wherein said second dataset comprises a new, but related, based on said centroid seeds, dataset different than said first dataset.

6. The method in claim 5, all the limitations of which are incorporated herein by reference, further comprising:
    forming a second dictionary of most common words in said second dataset;
    generating a third vector space model by counting, for each word, in said second dictionary, a number of said second documents in which said word occurs; and
    clustering said documents in said second dataset based on said third vector space model to produce a second dataset cluster.

7. The method in claim 6, all the limitations of which are incorporated herein by reference, wherein said clustering of said second documents in said second dataset using said centroid seeds produces an adapted dataset cluster and said method further comprises:
- comparing classes in said adapted dataset cluster to classes in said second dataset cluster; and
- adding classes to said adapted dataset cluster based on said comparing.

8. A program device readable by machine tangibly embodying a program of instructions executable by the machine to perform a method of clustering documents in datasets comprising:
- clustering first documents in a first dataset to produce first document classes;
- creating centroid seeds based on said first document classes; and
- clustering second documents in a second dataset using said centroid seeds, such that said second dataset has a similar, based on said centroid seeds, clustering to that of said first dataset,
- wherein said second dataset comprises a new, but related, based on said centroid seeds, dataset different than said first dataset,
- wherein said clustering of said first documents in said first dataset comprises:
  - forming a first dictionary of most common words in said first dataset;
  - generating a first vector space model by counting, for each word in said first dictionary, a number of said first documents in which said word occurs; and
  - clustering said first documents in said first dataset based on said first vector space model.

9. A program device readable by machine, tangibly embodying a program of instructions executable by the machine to perform said method in claim 8, all the limitations of which are incorporated herein by reference, said method further comprising generating a second vector space model by counting, for each word in said first dictionary, a number of said second documents in which said word occurs.

10. A program device readable by machine, tangibly embodying a program of instructions executable by the machine to perform said method in claim 9, all the limitations of which are incorporated herein by reference, wherein said creating of said centroid seeds comprises:
- classifying said second vector space model using said first document classes to produce a classified second vector space model; and
- determining a mean of vectors in each class in said classified second vector space model, wherein said mean comprises said centroid seeds.

11. A program device readable by machine, tangibly embodying a program of instructions executable by the machine to perform said method in claim 9, all the limitations of which are incorporated herein by reference, said method further comprising:
- forming a second dictionary of most common words in said second dataset;
- generating a third vector space model by counting, for each word in said second dictionary, a number of said second documents in which said word occurs; and
- clustering said documents in said second dataset based on said third vector space model to produce a second dataset cluster.

12. A program device readable by machine, tangibly embodying a program of instructions executable by the machine to perform said method in claim 11, all the limitations of which are incorporated berein by reference, wherein said clustering of said second documents in said second dataset using said centroid seeds produces an adapted dataset cluster and said method further comprises:
- comparing classes in said adapted dataset cluster to classes in said second dataset cluster; and
- adding classes to said adapted dataset cluster based on said comparing.

* * * * *